(12) United States Patent
Greer

(10) Patent No.: US 10,572,283 B2
(45) Date of Patent: Feb. 25, 2020

(54) IMPLEMENTING REQUESTS ON A MODEL OF A SYSTEM PRIOR TO IMPLEMENTING ON THE SYSTEM

(71) Applicant: INTERNATIONAL BUSINESS MACHINES CORPORATION, Armonk, NY (US)

(72) Inventor: Timothy D. Greer, Endicott, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 159 days.

(21) Appl. No.: 15/815,216

(22) Filed: Nov. 16, 2017

(65) Prior Publication Data

US 2019/0146819 A1    May 16, 2019

(51) Int. Cl.
*G06F 9/455* (2018.01)
*G06F 9/445* (2018.01)
*G06F 9/50* (2006.01)

(52) U.S. Cl.
CPC ...... *G06F 9/45545* (2013.01); *G06F 9/44505* (2013.01); *G06F 9/5077* (2013.01)

(58) Field of Classification Search
CPC . G06F 9/45545; G06F 9/5077; G06F 9/44505
See application file for complete search history.

(56) References Cited

U.S. PATENT DOCUMENTS

| 8,099,596 | B1 * | 1/2012 | Rusakov | G06F 21/53 |
| | | | | 380/200 |
| 9,052,935 | B1 * | 6/2015 | Rajaa | G06F 9/5033 |
| 9,075,410 | B2 * | 7/2015 | Ohkado | G06F 21/552 |
| 9,585,085 | B1 * | 2/2017 | Guo | H04L 43/0876 |
| 2005/0260973 | A1 * | 11/2005 | van de Groenendaal | |
| | | | | H04L 63/102 |
| | | | | 455/411 |
| 2006/0021029 | A1 * | 1/2006 | Brickell | G06F 21/51 |
| | | | | 726/22 |
| 2007/0143591 | A1 * | 6/2007 | Dellacona | G06F 11/1417 |
| | | | | 713/2 |
| 2007/0294707 | A1 * | 12/2007 | Taillefer | G06F 9/5077 |
| | | | | 719/319 |

(Continued)

FOREIGN PATENT DOCUMENTS

KR    1020160071682 A    6/2016

OTHER PUBLICATIONS

IBM, "z/Architecture—Principles of Operation," IBM Publication No. SA22-7832-10, Eleventh Edition, Mar. 2015, pp. 1-1732.

(Continued)

*Primary Examiner* — Adam Lee
(74) *Attorney, Agent, or Firm* — Edward Wixted, Esq.; Blanche E. Schiller, Esq.; Heslin Rothenberg Farley & Mesiti P.C.

(57) ABSTRACT

A model of a system is created and used to implement changes of the system, prior to implementing those changes on the system. The model has certain attributes of the system, including a similar system configuration and a similar processor work load. The model receives requested actions and implements those actions. If the actions are acceptable, those actions are then performed on the system being modeled. Provision is made for keeping the model current.

20 Claims, 11 Drawing Sheets

(56) References Cited

U.S. PATENT DOCUMENTS

| | | | |
|---|---|---|---|
| 2008/0234998 A1* | 9/2008 | Cohen | G06F 9/451 703/24 |
| 2008/0234999 A1* | 9/2008 | Cohen | G06F 11/261 703/26 |
| 2008/0235000 A1* | 9/2008 | Cohen | G06F 21/53 703/26 |
| 2008/0235001 A1* | 9/2008 | Cohen | G06F 9/30174 703/26 |
| 2008/0235002 A1* | 9/2008 | Cohen | G06F 9/45504 703/26 |
| 2008/0235711 A1* | 9/2008 | Cohen | G06F 9/45504 719/318 |
| 2008/0235756 A1* | 9/2008 | Cohen | G06F 9/45533 726/1 |
| 2008/0235764 A1* | 9/2008 | Cohen | G06F 21/6218 726/1 |
| 2009/0313358 A1* | 12/2009 | Shepherd | H04L 41/5054 709/221 |
| 2010/0083248 A1* | 4/2010 | Wood | G06F 9/5077 718/1 |
| 2011/0023029 A1* | 1/2011 | Diab | G06F 9/5077 718/1 |
| 2011/0209218 A1* | 8/2011 | McRae | G06F 21/53 726/23 |
| 2012/0016778 A1* | 1/2012 | Salle | G06F 9/5072 705/27.1 |
| 2012/0060167 A1* | 3/2012 | Salsburg | G06F 9/50 718/104 |
| 2012/0311106 A1* | 12/2012 | Morgan | H04L 41/0806 709/220 |
| 2013/0019242 A1* | 1/2013 | Chen | H04L 41/145 718/1 |
| 2013/0167157 A1* | 6/2013 | Daumling | G06F 9/548 719/318 |
| 2013/0326508 A1* | 12/2013 | Tsirkin | G06F 9/455 718/1 |
| 2014/0108774 A1* | 4/2014 | Bennah | G06F 8/60 713/2 |
| 2014/0195853 A1* | 7/2014 | Singh | G06F 11/2294 714/33 |
| 2014/0273965 A1* | 9/2014 | Raleigh | H04W 12/04 455/411 |
| 2014/0317392 A1 | 10/2014 | Kawano et al. | |
| 2015/0052092 A1 | 2/2015 | Tang et al. | |
| 2015/0089479 A1* | 3/2015 | Chen | G06F 11/3664 717/124 |
| 2015/0339475 A1* | 11/2015 | Feroz | G06F 21/566 726/23 |
| 2016/0026488 A1 | 1/2016 | Bond et al. | |
| 2016/0125059 A1* | 5/2016 | Jain | G06F 16/13 707/639 |
| 2016/0132420 A1* | 5/2016 | Kuo | G06F 11/3684 717/130 |
| 2016/0292420 A1* | 10/2016 | Langton | G06F 21/566 |
| 2016/0364261 A1 | 12/2016 | Oh et al. | |
| 2017/0080346 A1* | 3/2017 | Abbas | A63F 13/825 |
| 2017/0168918 A1* | 6/2017 | Wieczorek | G06F 11/3664 |
| 2018/0006872 A1* | 1/2018 | Johnson | H04L 41/0266 |

OTHER PUBLICATIONS

IBM, "Power ISA—V2.07B," Apr. 9, 2015, pp. 1-1527.
Mel, Peter and Tim Grance, "The NIST Definition of Cloud Computing," National Institute of Standards and Technology, Information Technology Laboratory, Special Publication 800-145, Sep. 2011, pp. 1-7.

* cited by examiner

OBTAIN, FROM ONE SYSTEM, A REQUEST OF AN ACTION TO BE IMPLEMENTED ON ANOTHER SYSTEM ~700

THE OTHER SYSTEM IS MODELED BASED ON THE ONE SYSTEM ~702

THE ACTION IS TO BE IMPLEMENTED ON THE OTHER SYSTEM PRIOR TO BEING IMPLEMENTED ON THE ONE SYSTEM ~704

PERFORM THE ACTION BY THE OTHER SYSTEM ~706

SEND AN INDICATION TO THE ONE SYSTEM SPECIFYING WHETHER THE ONE SYSTEM IS TO IMPLEMENT THE ACTION ~708

THE ONE SYSTEM IS A FIRST LEVEL HOST SYSTEM OF THE OTHER SYSTEM, AND THE OTHER SYSTEM IS A GUEST OF THE FIRST LEVEL HOST SYSTEM ~710

THE ONE SYSTEM INCLUDES AN ANTICIPATOR COMPONENT ~712

THE OBTAINING INCLUDES

DETERMINING, BY THE OTHER SYSTEM, THAT THE REQUEST IS BEING RECEIVED FROM THE ANTICIPATOR COMPONENT ~714

PERFORMING THE ACTION, BASED ON DETERMINING THAT THE REQUEST IS BEING RECEIVED FROM THE ANTICIPATOR COMPONENT ~716

THE ANTICIPATOR COMPONENT IS A GUEST OF THE FIRST LEVEL HOST SYSTEM ~718

FIG. 7A

THE SENDING INCLUDES SENDING A RESULT OF THE ACTION TO THE ONE SYSTEM — 720

THE OTHER SYSTEM IS CONFIGURED BASED ON THE ONE SYSTEM AND INCLUDES A PROCESSING LOAD BASED ON THE ONE SYSTEM — 722

THE ONE SYSTEM INCLUDES A WATCHER COMPONENT — 724

OBTAIN, BY THE OTHER SYSTEM FROM THE WATCHER COMPONENT, A CONFIGURATION UPDATE FOR THE OTHER SYSTEM — 726

THE CONFIGURATION UPDATE INCLUDES ONE OR MORE NEW USERS LOGGED ON TO THE ONE SYSTEM — 728

THE OTHER SYSTEM INCLUDES AN IMPLEMENTER COMPONENT — 730

DETERMINE, BY THE IMPLEMENTER COMPONENT, THAT THE CONFIGURATION UPDATE HAS BEEN OBTAINED FROM THE WATCHER COMPONENT — 732

PERFORM ONE OR MORE ACTIONS BY THE IMPLEMENTER COMPONENT BASED ON DETERMINING THAT THE CONFIGURATION UPDATE HAS BEEN OBTAINED — 734

THE ONE OR MORE ACTIONS INCLUDE AUTOLOGGING ONE OR MORE USERS SPECIFIED IN THE CONFIGURATION UPDATE — 736

FIG. 7B

IMPLEMENTING REQUESTS ON A MODEL OF A SYSTEM PRIOR TO IMPLEMENTING ON THE SYSTEM

BACKGROUND

One or more aspects relate, in general, to processing within a computing environment, and in particular, to facilitating such processing.

A computing environment includes one or more computing systems, and a computing system typically includes hardware and computer programs that are managed by an operating system. The operating system performs a number of tasks including recognizing input, sending output, keeping track of files, controlling peripheral devices and providing security, as examples.

Operating systems, however, generally lack the ability to recognize and protect themselves from dangerous requests. Commands are accepted and loads are processed. It is typically the responsibility of a system administrator to take action to protect the system. For example, if operating system code is modified by, for instance, introducing an exit or other code or restarting a new version of the code, the system administrator is responsible for taking action if the change negatively affects the system.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes, for instance, obtaining from one system, a request of an action to be implemented on another system. The other system is modeled based on the one system, and the action is to be implemented on the other system prior to being implemented on the one system. The action is performed by the other system, and an indication is sent to the one system specifying whether the one system is to implement the action.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict one embodiment of facilitating processing within a computing environment, in accordance with an aspect of the present invention;

DETAILED DESCRIPTION

Figure 1:
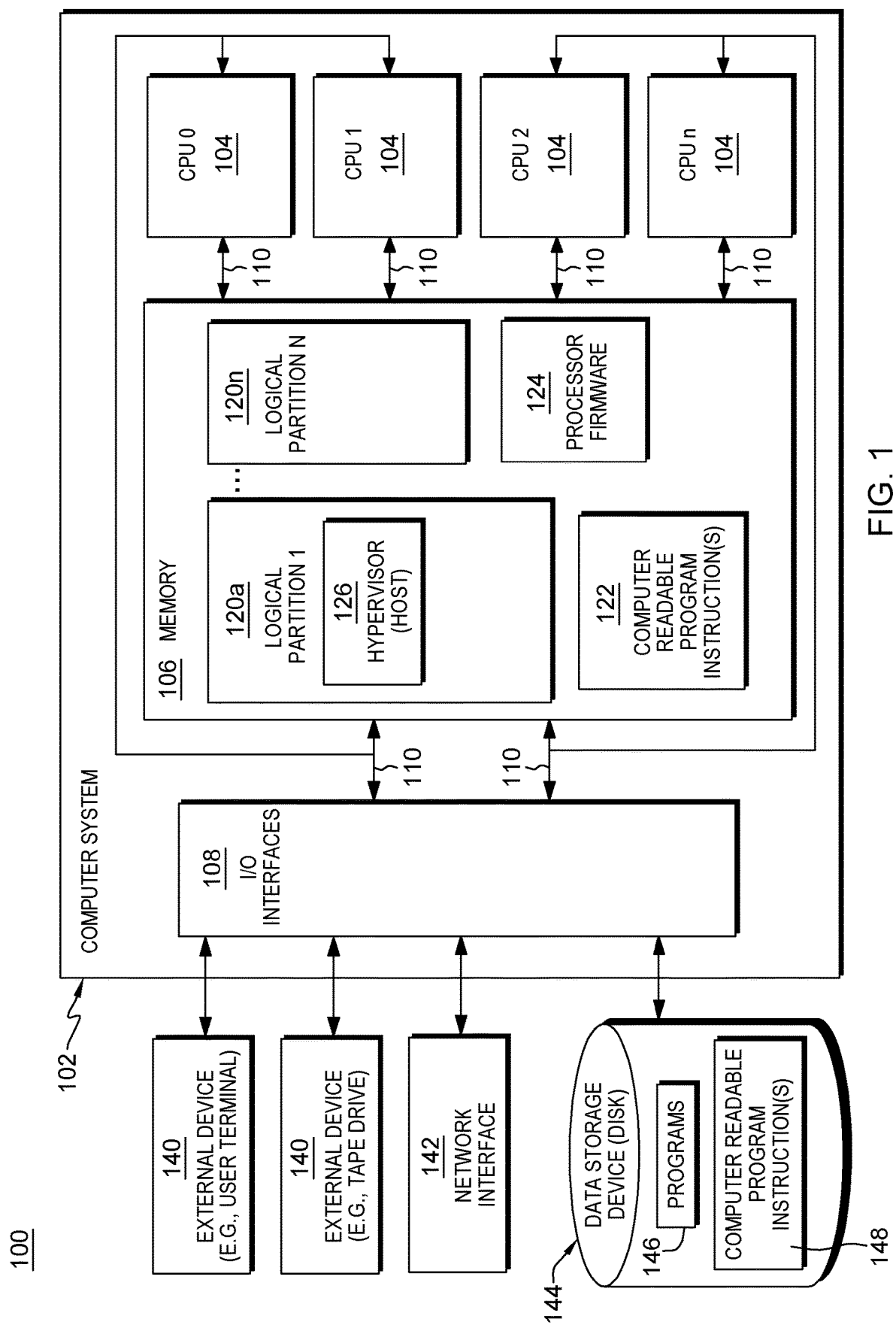
FIG. 1 depicts one example of a computing environment to incorporate and use one or more aspects of the present invention.

In accordance with an aspect of the present invention, a capability is provided to create a self-aware system, such as a self-aware operating system. With this capability, aspects of one system are modeled on another system, referred to herein as a model. The model may change as the aspects of the one system change. Further, in one aspect, actions to be implemented on the one system are initially implemented on the model. Then, if those actions are acceptable, they are implemented on the one system. One or more aspects of the capability enable the one system to become self-aware by dynamically determining actions to be tested on the model.

As one example, the one system is a first level system, and the other system is a second level system. In such an example, the first level system is a hypervisor (e.g., an operating system), which hosts guests, such as the second level system. The guests may be, e.g., guests that run operating systems or guests that run work other than operating systems. As used herein, a guest of the first level system is referred to as a first level guest. If a guest of the first level system is running an operating system, then it may be referred to as a second level system. A second level system may also have guests which are referred to as second level guests, and so forth.

In another example, the one system and the other system are separate systems coupled to one another (i.e., not host/guest). For example, the one system may be in one logical partition and the other system, the model, may be in another logical partition communicatively coupled to the one logical partition. Other variations are also possible.

By creating and using the model, the one system (i.e., the system being modeled) is protected by not implementing unacceptable requests on the one system. This facilitates processing, and improves performance.

Various aspects are described herein. Further, many variations are possible without departing from the spirit of aspects of the present invention. It should be noted that, unless otherwise inconsistent, each aspect or feature described herein and variants thereof, may be combinable with any other aspect or feature.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, Mar. 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1, a computing environment 100 includes, for instance, a computer system 102, such as a central processor complex, that may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, one or more logical partitions 120a . . . 120n, one or more computer readable program instructions 122, and processor firmware 124. Computer readable program instructions 122 may be configured to carry out functions of embodiments of aspects of the invention. Further, as used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, at least one logical partition, such as logical partition 120a, includes a hypervisor 126, such as z/VM offered by International Business Machines Corporation, Armonk, N.Y. In one example, hypervisor 126 is referred to as a host. In the examples herein, hypervisor 126 is referred to as a first level system.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

In one example, I/O interfaces 108 include an I/O subsystem that directs the flow of information between input/output control units (not shown), devices 140, and memory 106. The control units are coupled between memory 106 and devices 140.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In the above example computing environment, a logical partition, such as logical partition 120a, includes a first level system, which is a hypervisor or host operating system, such as z/VM. This first level system can initiate guests, which run on the first level system. When these guests are running operating systems they may be referred to as second level systems. Further details regarding first and second level systems are described with reference to FIG. 2.

Figure 2:
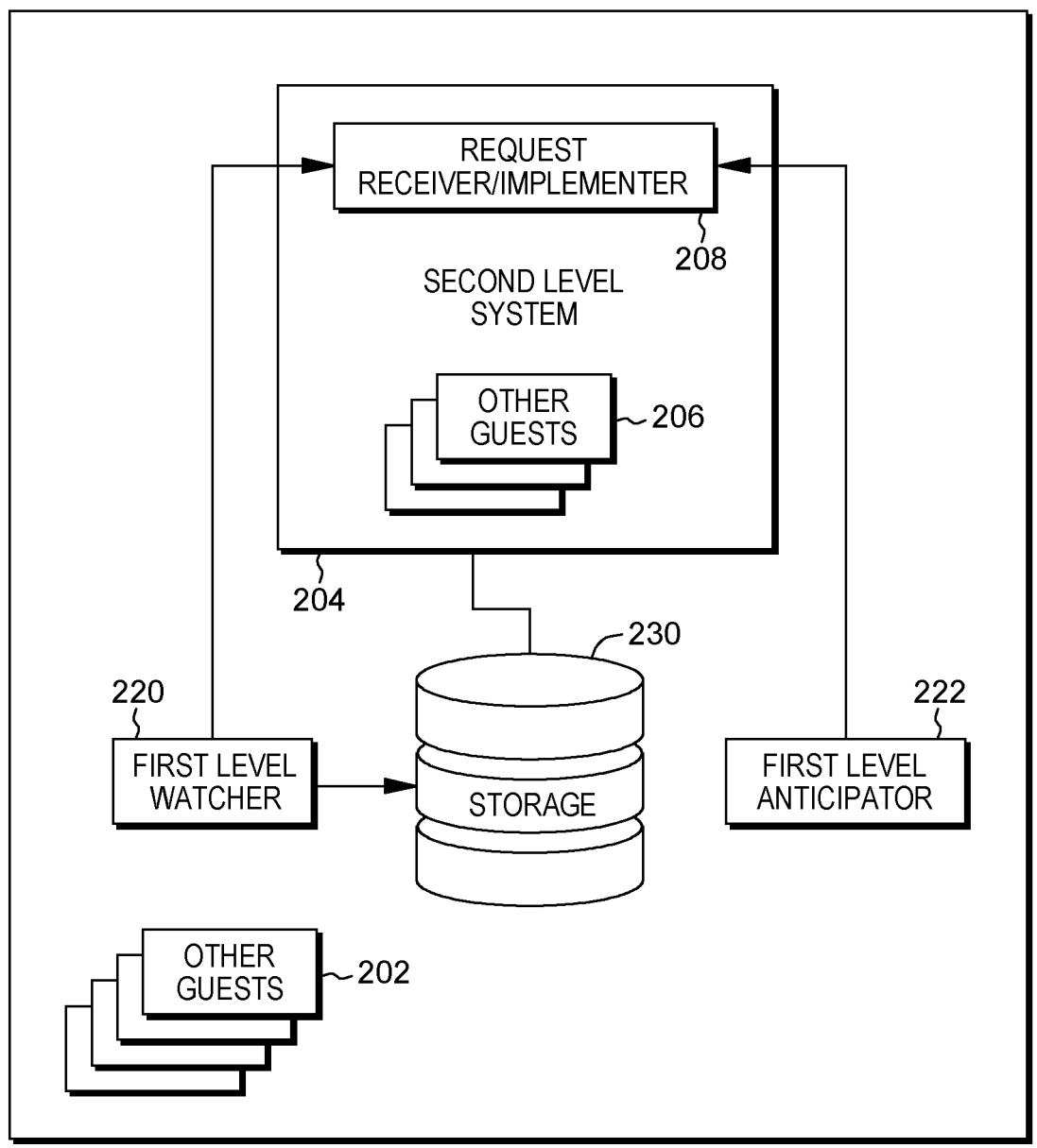
FIG. 2 depicts details of a first level system, in accordance with an aspect of the present invention.

Referring to FIG. 2, a first level system 200 runs in a logical partition, such as logical partition 120a. This first level system is a hypervisor, e.g., z/VM, which may host one or more guests 202, which may be other operating systems, such as z/VM, Linux, z/OS, etc. Further, in accordance with an aspect of the present invention, the first level system, in accordance with an aspect of the present invention, starts a second level system 204 (e.g., z/VM), which is to model selected aspects of first level system 200.

In one example, to create second level system 204, the first level system logs on a first level guest which will run the second level system. At this point, the guest is not running an operating system, but instead, is running a user environment, such as CMS (Conversational Monitoring System). A program is run that performs selected set-up and then starts the operating system, e.g., z/VM. The guest and the second level system which it starts have read access to the system configuration file and files containing the operating system code (e.g., on z/VM, CPLOAD and any CP exits) of the first level system. The first level guest is not given, in this example, any other special privileges.

Second level system 204 may log on other guests 206, which may run an operating system. For instance, on second level system 204, a guest, which is automatically logged on, e.g., such as OPERATOR on z/VM, runs a program which causes other guests to be started (to be logged on). As an example, on z/VM, the guest may issue the XAUTOLOG command to direct the operating system to log on another specified guest. Further, in one example, second level system 204 logs on another guest 208, referred to as a request receiver/implementer (RRI). Guest 208 runs a user environment, such as CMS, instead of a guest operating system. Guest 208 runs a program that sits and waits to receive commands from the first level system. In particular, in one example, it receives commands from a first level watcher 220 of the first level system and/or a first level anticipator 222 of the first level system, as described in further detail below. First level watcher and first level anticipator are, for instance, guests of the first level system. In other embodiments in which, for instance, the system being modeled and the model are separate systems (not host/guest), the watcher and anticipator are components of the one system being modeled.

First level watcher 220 and second level system 204 are coupled to storage 230. Storage 230 is used for a number of tasks, including, but not limited to, paging, and communicating between the second level system and the first level system, as examples.

Figure 3:
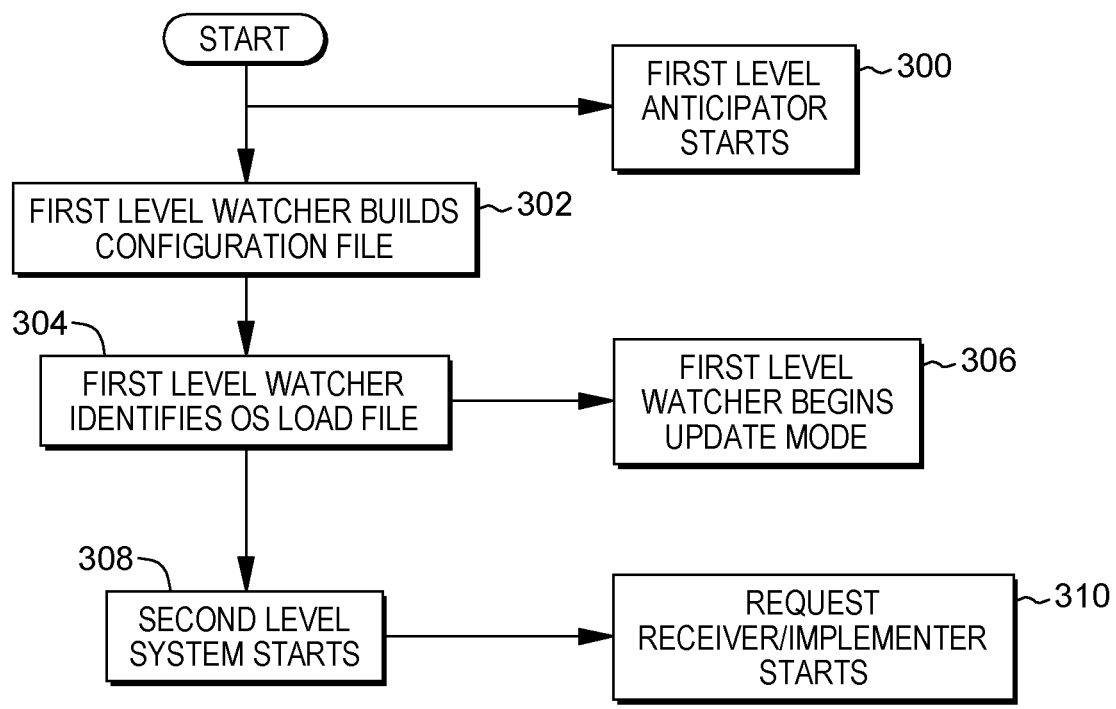
FIG. 3 depicts one example of initialization logic used in accordance with an aspect of the present invention.

One embodiment of details associated with initializing first level watcher 220 and first level anticipator 222 are described with reference to FIG. 3. Based on starting the first level system (e.g., z/VM), certain guests (also referred to herein as users), as specified in the system configuration file, are caused to be logged on by the operating system, as part of initialization. Those guests can autolog other users, such as, for instance, first level anticipator 222, STEP 300. Guest autologging other guests is accomplished, for example, using, for instance, the XAUTOLOG command if on z/VM, as described herein. Further, first level watcher 220 is autologged and builds a configuration file that includes an indication of the configuration of the first level system (e.g., IPL (initial program load) parameters, pages allocated, etc.), STEP 302. Additionally, the first level watcher identifies the operating system load file (e.g., CPLOAD) of the first level system, STEP 304, and the first level watcher begins update mode, STEP 306.

Moreover, second level system 204 begins, STEP 308, including request receiver/implementer 208, STEP 310. In one example, the guest running second level system 204 has, e.g., read-only access to various disks that include files used to bring up and run the second level system. These disks may be defined as virtual disks in storage, which the host supplies from memory, instead of permanent storage, in one example.

In one embodiment, in starting the second level system, a guest of the first level system is caused to be logged on. The guest of the first level system starts a bring-up program. The bring-up program causes the first level watcher to be logged on if it is not already on. As indicated in STEP 302, the first level watcher performs initial queries and writes results to a data file accessible by the original guest. The data in the file, as obtained from the initial queries, guide the defining of an initial configuration for the second level operating system. The selection of the initial queries depends on the chosen detail and type of modeling. Examples include queries of CPLOAD (the operating system code itself), IPL parameters (IPLPARMS), connectivity hardware such as ISLINKs, processor numbers and types (PROC), DASD owned by the operating system (CPOWN), allocation of that DASD to specific uses (ALLOC PAGE, ALLOC SPOOL), etc. Further, as indicated in STEP 306, the first level watcher then enters a loop, periodically issuing, e.g., QUERY NAMES to determine the users logged on to the first level system (and/or possibly other queries), and writing results to another data file accessible by the second level system.

The bring-up program running in the first level guest builds the system configuration file which the second level system is to employ by using a prototype, copying entries from the system configuration file of the first level system other than those overridden by entries in the prototype, and adjusting the configuration file to current conditions, as reflected by the queries of the watcher. For example, the CPOWNed list is made to match the current situation, which may be different from what is specified in the first level system configuration file. Such differences may occur, for example, due to dynamic changes made since IPL of the first level system.

The bring-up program also builds a user directory using its prototype base and adding as user entries any logged-on first level guests identified by the first level watcher which are not already in the prototype directory.

Further, the bring-up program uses other information from the first level watcher (e.g., QUERY ALLOC PAGE, QUERY ALLOC SPOOL) and pre-defined attributes to define, format and initialize the virtual disks to be used. Having created configuration files and positioned files as needed, the bring-up program ends by IPLing the second level operating system.

Figure 4:
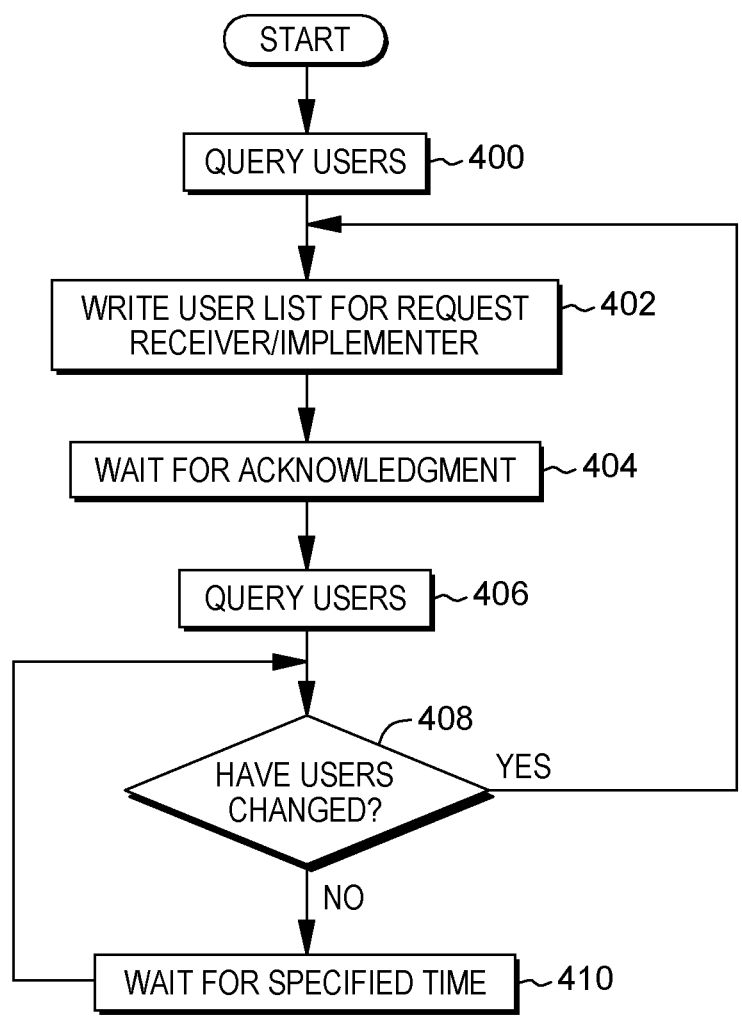
FIG. 4 depicts one example of processing performed by a watcher component, in accordance with an aspect of the present invention.

As described above, in one embodiment, first level watcher 220 is a guest of first level system 200, and in one example, runs a user environment, such as CMS. It performs system queries and supplies the data to the second level system. It is given privileges to the extent needed for the queries. As one particular example, it periodically runs queries of the first level system to determine various aspects of the first level system, including, for instance, a current configuration of the first level system—e.g., the users (also known as guests) logged on to the first level system, and/or other aspects of the first level system, such as the processing load (e.g., on z/VM, the output of the INDICATE command), as examples. Further details of the first level watcher are described with reference to FIG. 4.

In one embodiment, first level watcher 220 queries the users (i.e., the guests running on the system, such as, for instance, virtual machines) of the first level system to determine which users are logged on, STEP 400. Based on the responses to the queries, it creates a user list (e.g., a list of guests) that is provided to request receiver/implementer 208, STEP 402. First level watcher 220 awaits acknowledgment of receipt of the user list from request receiver/implementer 208, STEP 404. Based on receiving the acknowledgment, it performs another query of the users, STEP 406. (In one embodiment, if no acknowledgment is received within a predefined amount of time, the first level watcher can take action, such as providing a notification to the operating system.) Based on the multiple queries, first level watcher 220 determines whether there is a change in the user configuration, INQUIRY 408. If there is a change in the user configuration, then processing continues with STEP 402, in which an updated user list is provided to request receiver/implementer 208. However, if the user configuration has not changed, then the first level watcher waits a specified time (e.g., an amount of time (e.g., 2 minutes), a number of cycles, etc.), STEP 410. Based on that specified time expiring, processing continues with INQUIRY 408.

In other embodiments, the watcher may perform more or different queries, according to the first level system aspects which are being modeled. One purpose of the watcher, beyond supplying information for the initial configuration, is to keep the model up-to-date.

As indicated above, in addition to the first level watcher, in one embodiment, there is another guest of the first level system, first level anticipator 222. First level anticipator 222 supplies data and/or requests to the second level system, but this data and/or requests are in anticipation of being provided or implemented on the first level system. No special privileges are provided to the first level anticipator, in one example.

First level anticipator 222 is used to indicate to the second level system (the model) that a particular action is to be performed by the second level system. The second level system performs the action, and if there does not appear to be a problem with the action, then that action may be implemented on the first level system. Thus, instead of implementing the action on the first level system and then providing that action to the second level system, the action is implemented on the second level system first, and if it appears to be an acceptable action, then that action is implemented on the first level system. Further details regarding processing associated with the first level anticipator are described with reference to FIG. 5.

Figure 5:
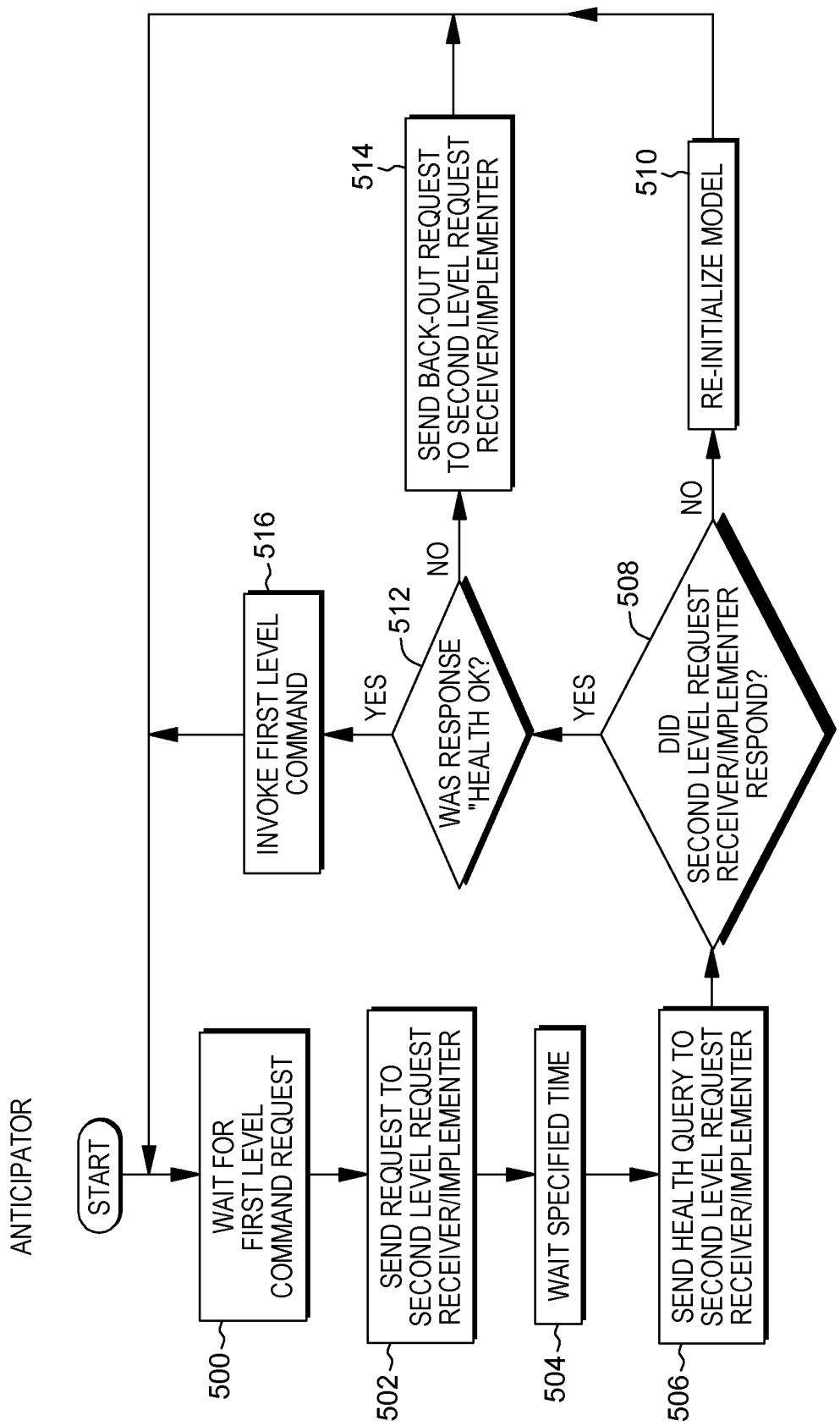
FIG. 5 depicts one example of processing performed by an anticipator component, in accordance with an aspect of the present invention.

Referring to FIG. 5, in one embodiment, first level anticipator 222 waits to obtain from the first level system (e.g., z/VM) a command request specifying an action to be performed by the second level system to test the action before being released onto the first level system, STEP 500. Example actions include a re-IPL with a CP load, create a virtual switch, perform a query, delete, copy, etc. Based on receiving the request, first level anticipator sends the request to request receiver/implementer 208, STEP 502. Anticipator 222 waits a specified amount of time depending on the action to be performed, STEP 504. For example, a SHUTDOWN REIPL request asks for the second level system to restart, which would be expected to take on the order of 30 seconds. To allow some safety factor, the anticipator might wait, e.g., 3 minutes or some other predefined amount of time or processing cycles, etc. after this request. The anticipator then sends a query to request receiver/implementer 208 requesting status of the action; i.e., requesting status as to whether the request is acceptable or is causing any problems with the second level system, STEP 506.

A determination is made as to whether request receiver/implementer 208 responded to the query, INQUIRY 508. If not, then the model (e.g., the second level system) is re-initialized (e.g., using the virtual disks), STEP 510, and processing continues to STEP 500. If, however, request receiver/implementer 208 responded, then a further determination is made as to whether the response indicates the second level system is healthy, INQUIRY 512. That is, has the action negatively affected the second level system or is it acceptable? For instance, if the request was a re-IPL, and the second level system has not re-IPL'd after a predefined amount of time, then the action has negatively affected the second level system; or for another request, the question may be whether the system is running too slowly; etc. If the response indicates that the action is not acceptable, then anticipator 222 sends a back-out request to request receiver/implementer 208 to back-out the action, STEP 514, and processing continues to STEP 500. Otherwise, the action is invoked on the first level system, STEP 516, and processing continues to STEP 500.

Further details of one embodiment of processing by request receiver/implementer 208 are described with reference to FIG. 6. The request receiver/implementer receives, e.g., commands and data from a next lower level (e.g., level 1) watcher and anticipator, and uses the information to change the operating system, or its environment, or its users (guests). It is to have corresponding privileges to perform the actions. It can also provide information regarding the second level system, including status and performance information, to, e.g., the anticipator.

Figure 6:
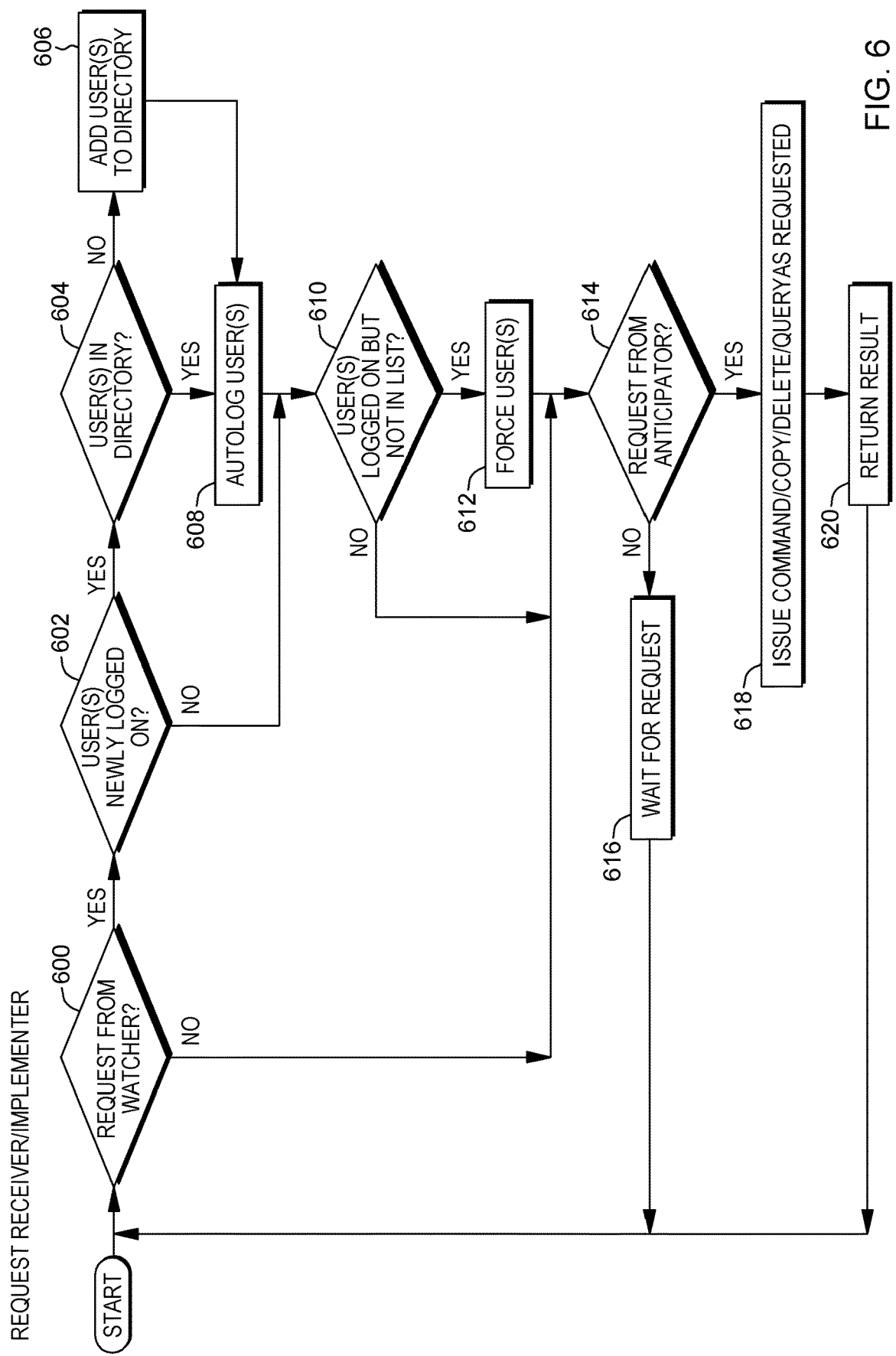
FIG. 6 depicts one example of an implementer component processing requests received from various components, in accordance with an aspect of the present invention.

Referring to FIG. 6, in one embodiment, a determination is made by the request receiver/implementer as to whether a request (e.g., a list of users currently logged on first level) has been received from first level watcher 220, INQUIRY 600. If so, then a further determination is made as to whether one or more users are newly logged on, INQUIRY 602. If there are one or more new users logged on, then a further determination is made as to whether the one or more users are in the user directory, INQUIRY 604. If one or more users are not in the directory, then those users are added to the user directory, STEP 606. Thereafter, or if the users are already in the directory, the request receiver/implementer uses e.g., the XAUTOLOG command, to cause the one or more newly logged on users to become logged on the second level, STEP 608.

Subsequently, or if there are no users newly logged on, a further determination is made as to whether one or more users are currently logged on to the second level system, but not in the user list provided by watcher 220, INQUIRY 610. If there are one or more users logged on second level but not in the user list, then, in one embodiment, those users are caused to be logged off, STEP 612. On z/VM, the request receiver/implementer 208 accomplishes this by means of the FORCE command.

Thereafter, or if the users that are logged on are in the user list, a further determination is made as to whether there is a request from anticipator 222, INQUIRY 614. If there is a request from the anticipator, then the action, which may be a command, a copy, a delete, a query, etc., is performed by request receiver/implementer 208, STEP 618. The result is returned to the anticipator, STEP 620, and processing continues with INQUIRY 600.

Returning to INQUIRY 614, if a request was not received from the anticipator, then request receiver/implementer waits for a request, STEP 616, and processing continues to INQUIRY 600.

At INQUIRY 600, if a request was not received from first level watcher 220, then a further inquiry is made as to whether a request was received from first level anticipator 222, INQUIRY 614, and processing continues, as described above.

Although in the above example the request from the watcher relates to the users being logged on, other requests from the watcher may be processed by the request receiver/implementer.

As described above, the second level system runs an operating system that models the first level system, at least in certain aspects. For instance, the second level system has prototype versions of the configuration file and a user directory of the first level system. At start-up, the bring-up program, which is setting up the second level system, uses information provided by, e.g., the first level watcher, to fill out the files. Further, the watcher watches the first level system and attempts to have the second level system match the first level system, in terms of configuration and/or user information, as examples. Additionally, the anticipator anticipates selected changes to the first level system, and attempts to have the second level system match the anticipated changes. The request receiver/implementer serves as a conduit for the requests of the watcher and anticipator, and makes feedback available. In one aspect, to limit performance and capacity impacts, the model is to be implemented as a fraction (e.g., on a z/VM first level system with 300 G of memory storage, the model is implemented as, e.g., a 5G second level system; many other examples are possible) of the size of the modeled system. Further, the model may include a model of itself, and so forth. If the model includes a model of itself, this third-level system would then be sized at a fraction of a fraction, and similarly for any higher level models. Since there is a minimum viable size for an operating system, the number of such levels is finite, and one consideration is to provide for automatic pass of tests when there is no model available to perform the test.

Scaling of the model becomes a consideration as one tries to account for more effects.

As a further extension, a list of reversible commands and their inverse (e.g., DEFINE/DETACH, XAUTOLOG/FORCE, etc.) may be generated. Before invoking first level, the second level system is tested by invoking the command, invoking its inverse, then invoking again. This would have the potential not only to discover problems with the command, but also problems undoing it in case that was desired.

In accordance with an aspect of the present invention, actions (e.g., changes) to be implemented on a first level system are first performed on a second level system, and if acceptable, then the actions are implemented on the first level system. In the above examples, the second level system is a guest of the first level system; however, in another example, the second level system may not be a guest of the first level system.

Although the examples above refer to z/VM as an example operating system and refer to specific commands, many other operating systems and respective commands may be used. Aspects of the invention are not limited to z/VM or the specific commands mentioned.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 7A-7B.

Referring to FIG. 7A, in one embodiment, a request is obtained from one system, and the request specifies an action to be implemented on another system (700). The other system is modeled based on the one system (702), and the action is to be implemented on the other system prior to being implemented on the one system (704). The action is performed by the other system (706), and an indication is sent to the one system specifying whether the one system is to implement the action (708).

As an example, the one system is a first level host system of the other system, and the other system is a guest of the first level host system (710).

Further, in one example, the one system includes an anticipator component (712), and the obtaining includes determining, by the other system, that the request is being received from the anticipator component (714). Based on determining that the request is being received from the anticipator component, the action is performed (716).

As an example the anticipator component is a guest of the first level host system (718).

Moreover, referring to FIG. 7B, in one embodiment, the sending includes sending a result of the action to the one system (720). In one example, the other system is configured based on the one system and includes a processing load based on the one system (722).

Additionally, in one example, the one system includes a watcher component (724), and a configuration update for the other system is obtained by the other system from the watcher component (726). The configuration update includes, for instance, one or more new users logged on to the one system (728).

In one example, the other system includes an implementer component (730), and a determination is made by the implementer component that the configuration update has been obtained from the watcher component (732). Based on determining that the configuration update has been obtained, one or more actions are performed by the implementer component (734). The one or more actions include autologging one or more users specified in the configuration update (736).

Figure 8A:
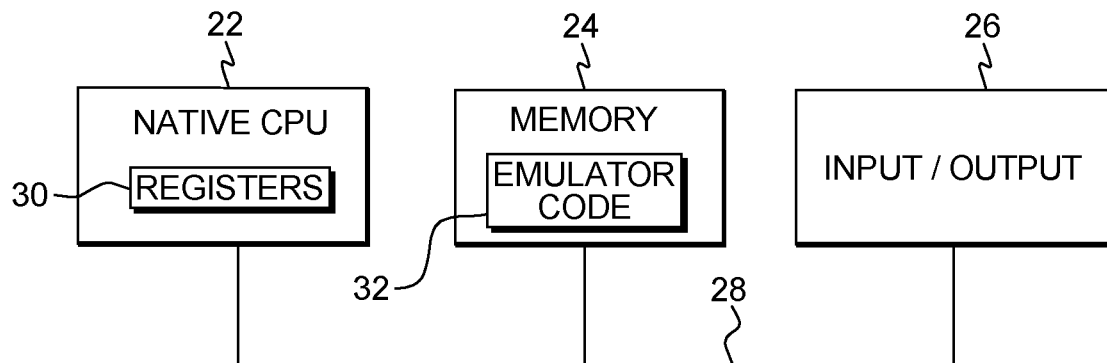
FIG. 8A depicts another example of a computing environment to incorporate and use one or more aspects of the present invention.

Other types of computing environments may also incorporate and use one or more aspects of the present invention, including, but not limited to, emulation environments, an example of which is described with reference to FIG. 8A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 8B:
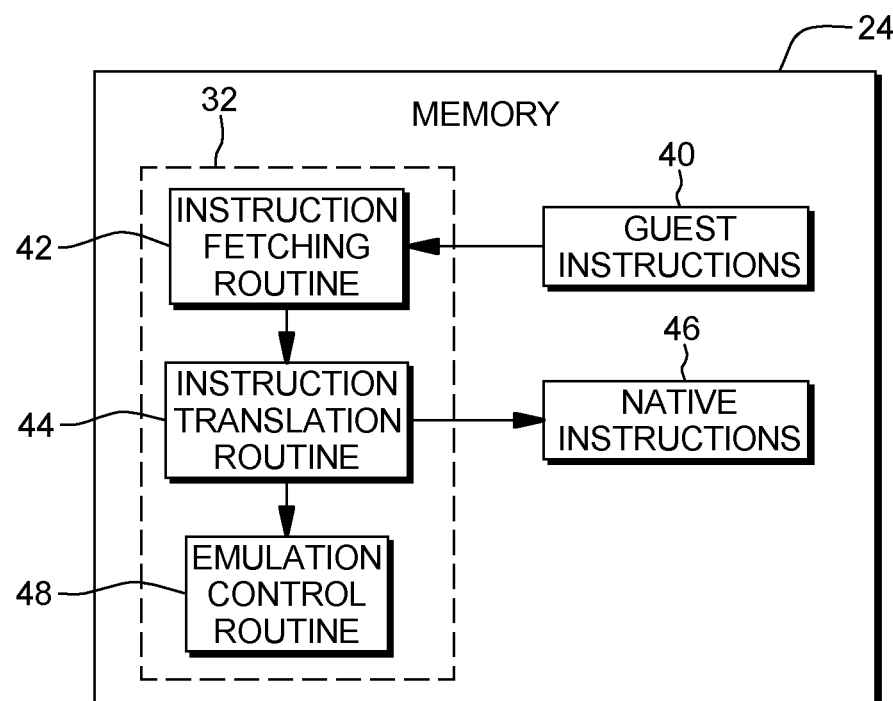
FIG. 8B depicts further details of the memory of FIG. 8A.

Further details relating to emulator code 32 are described with reference to FIG. 8B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
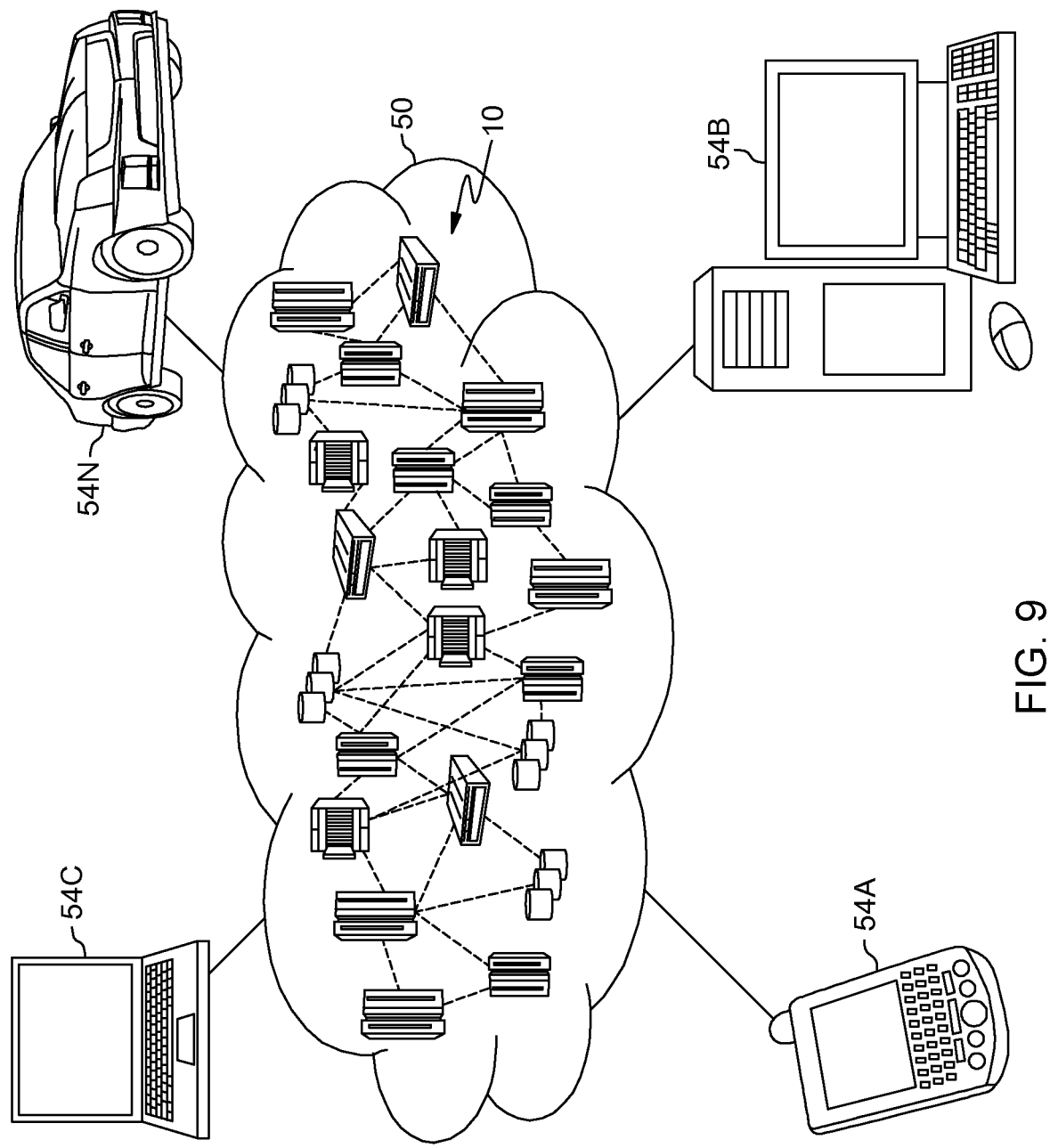
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
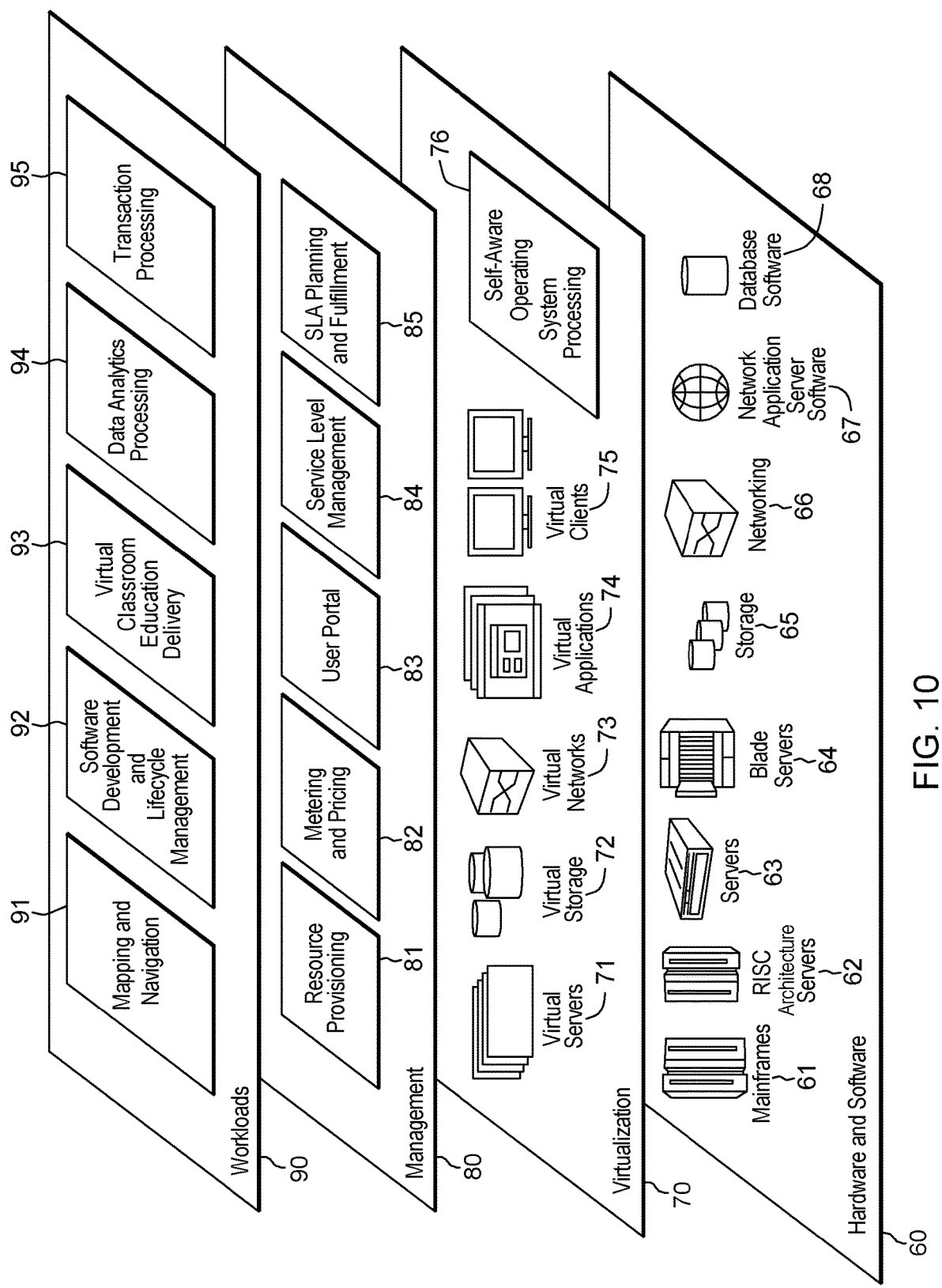
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; virtual clients 75; and self-aware operating system processing 76.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other host/guest levels may benefit from one or more aspects of the present invention. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
a computer readable storage medium readable by a processing circuit and storing instructions for performing a method comprising:
obtaining, from a first system, a request of an action to be performed on a second system, the first system comprising a first operating system and the second system comprising a second operating system, the second system being modeled based on the first system in which the second system matches one or more aspects of the first system including, at least, a configuration aspect of the first system, and wherein the action is to be performed on the second system prior to being implemented on the first system;
obtaining, by the second system and from the first system, a list of one or more users currently logged on to the first system;
determining, by the second system and based on the list, that one or more users are newly logged on to the first system, wherein the one or more users are newly logged on to the first system when the one or more users have been logged on to the first system for a specified amount of time;
determining, by the second system, whether the one or more users newly logged on to the first system are included in a user directory;
causing the one or more users newly logged on to the first system to become automatically logged on to the second system;
determining, by the second system, that there are one or more other users logged on to the second system but not included in the list;
causing the one or more other users logged on to the second system to be logged off of the second system;
performing the action by the second system; and
sending an indication to the first system specifying whether the first system is to perform the action.

2. The computer program product of claim 1, wherein the first system is a first level host system of the second system, and the second system is a guest of the first level host system.

3. The computer program product of claim 1, wherein the first system includes an anticipator component, and wherein the obtaining comprises:
determining, by the second system, that the request is being received from the anticipator component; and
performing the action, based on determining that the request is being received from the anticipator component.

4. The computer program product of claim 3, wherein the first system is a first level host system, and the anticipator component is a guest of the first level host system.

5. The computer program product of claim 1, wherein the sending comprises sending a result of the action to the first system.

6. The computer program product of claim 1, wherein the second system is configured based on the first system and includes a processing load based on the first system.

7. The computer program product of claim 1, wherein the first system includes a watcher component, and wherein the method further comprises obtaining, by the second system from the watcher component, a configuration update for the second system.

8. The computer program product of claim 7, wherein the configuration update includes information associated with one or more new users logged on to the first system.

9. The computer program product of claim 7, wherein the second system includes an implementer component, and wherein the method further comprises:
determining, by the implementer component, that the configuration update has been obtained from the watcher component; and
performing at least the action by the implementer component based on determining that the configuration update has been obtained.

10. The computer program product of claim 9, wherein the at least the action includes automatically logging one or more users specified in the configuration update on to the second system.

11. A computer system for facilitating processing within a computing environment, the computer system comprising:
a memory; and
a processor in communication with the memory, wherein the computer system is configured to perform a method, said method comprising:
obtaining, from a first system, a request of an action to be performed on a second system, the first system comprising a first operating system and the second system comprising a second operating system, the second system being modeled based on the first system in which the second system matches one or more aspects of the first system including, at least, a configuration aspect of the first system, and wherein the action is to be performed on the second system prior to being implemented on the first system;
obtaining, by the second system and from the first system, a list of one or more users currently logged on to the first system;
determining, by the second system and based on the list, that one or more users are newly logged on to the first system, wherein the one or more users are newly logged on to the first system when the one or more users have been logged on to the first system for a specified amount of time;
determining, by the second system, whether the one or more users newly logged on to the first system are included in a user directory;
causing the one or more users newly logged on to the first system to become automatically logged on to the second system;
determining, by the second system, that there are one or more other users logged on to the second system but not included in the list;
causing the one or more other users logged on to the second system to be logged off of the second system;
performing the action by the second system; and
sending an indication to the first system specifying whether the first system is to perform the action.

12. The computer system of claim 11, wherein the first system is a first level host system of the second system, and the second system is a guest of the first level host system.

13. The computer system of claim 11, wherein the first system includes an anticipator component, and wherein the obtaining comprises:
determining, by the second system, that the request is being received from the anticipator component; and performing the action, based on determining that the request is being received from the anticipator component.

14. The computer system of claim 11, wherein the first system includes a watcher component, and wherein the method further comprises obtaining, by the second system from the watcher component, a configuration update for the second system.

15. The computer system of claim 14, wherein the second system includes an implementer component, and wherein the method further comprises:
   determining, by the implementer component, that the configuration update has been obtained from the watcher component; and
   performing at least the action by the implementer component based on determining that the configuration update has been obtained.

16. A computer-implemented method of facilitating processing within a computing environment, the computer-implemented method comprising:
   obtaining, from a first system, a request of an action to be performed on a second system, the first system comprising a first operating system and the second system comprising a second operating system, the second system being modeled based on the first system in which the second system matches one or more aspects of the first system including, at least, a configuration aspect of the first system, and wherein the action is to be performed on the second system prior to being implemented on the first system;
   obtaining, by the second system and from the first system, a list of one or more users currently logged on to the first system;
   determining, by the second system and based on the list, that one or more users are newly logged on to the first system, wherein the one or more users are newly logged on to the first system when the one or more users have been logged on to the first system for a specified amount of time;
   determining, by the second system, whether the one or more users newly logged on to the first system are included in a user directory;
   causing the one or more users newly logged on to the first system to become automatically logged on to the second system;
   determining, by the second system, that there are one or more other users logged on to the second system but not included in the list;
   causing the one or more other users logged on to the second system to be logged off of the second system;
   performing the action by the second system; and
   sending an indication to the first system specifying whether the first system is to perform the action.

17. The computer-implemented method of claim 16, wherein the first system is a first level host system of the second system, and the second system is a guest of the first level host system.

18. The computer-implemented method of claim 16, wherein the first system includes an anticipator component, and wherein the obtaining comprises:
   determining, by the second system, that the request is being received from the anticipator component; and
   performing the action, based on determining that the request is being received from the anticipator component.

19. The computer-implemented method of claim 16, wherein the first system includes a watcher component, and wherein the method further comprises obtaining, by the second system from the watcher component, a configuration update for the second system.

20. The computer-implemented method of claim 19, wherein the second system includes an implementer component, and wherein the method further comprises:
   determining, by the implementer component, that the configuration update has been obtained from the watcher component; and
   performing at least the action by the implementer component based on determining that the configuration update has been obtained.

* * * * *